United States Patent [19]

Miyashita

[11] Patent Number: 5,701,280

[45] Date of Patent: Dec. 23, 1997

[54] OPTICAL INFORMATION RECORDING AND/OR REPRODUCING APPARATUS IN WHICH A REPRODUCING LIGHT BEAM IS MODULATED WITH AT LEAST A 100% DEGREE OF MODULATION

[75] Inventor: Akira Miyashita, Tokorozawa, Japan

[73] Assignee: Canon Kabushiki Kaisha, Tokyo, Japan

[21] Appl. No.: 789,600

[22] Filed: Jan. 24, 1997

Related U.S. Application Data

[63] Continuation of Ser. No. 254,056, Jun. 3, 1994, abandoned.

[30] Foreign Application Priority Data

Jun. 7, 1993 [JP] Japan ................... 5-160024

[51] Int. Cl.$^6$ .............. G11B 11/00; G11B 7/00
[52] U.S. Cl. .............. 369/13; 369/44.38; 369/116
[58] Field of Search ............... 369/13, 14, 110, 369/112, 44.23, 44.14, 44.37, 44.38, 121, 44.39, 116; 360/114, 59

[56] References Cited

U.S. PATENT DOCUMENTS

| | | | |
|---|---|---|---|
| 5,142,513 | 8/1992 | Takehara et al. | 369/13 |
| 5,272,667 | 12/1993 | Yamada et al. | 365/113 |
| 5,357,493 | 10/1994 | Okazaki et al. | 369/13 |
| 5,365,535 | 11/1994 | Yamaguchi et al. | 369/121 X |

*Primary Examiner*—Ali Neyzari
*Attorney, Agent, or Firm*—Fitzpatrick, Cella, Harper & Scinto

[57] ABSTRACT

An optical information recording and/or reproducing apparatus includes a first light source for recording or erasing information, a first current source for modulating a light beam from the first light source in accordance with a recording signal, a second light source for verification, and a second current source for supplying a current to the second light source to cause the second light source to emit a reproducing light beam. The light beam from the first light source leads on an information track on an optical recording medium, and the light beam from the second light source follows on the information track. Based on reflected light from the optical recording medium, of the light beam from the second light source, information recorded by the light beam from the first light source is reproduced for verification. The apparatus further has an inductor disposed in a current supply path from the second current source to the second light source, which has an impedance sufficiently larger than an impedance of the second light source at a recording signal frequency, and a high-frequency oscillator for modulating a light output from the second light source, which applies a high-frequency current with a frequency sufficiently higher than the recording signal frequency.

5 Claims, 5 Drawing Sheets

_5,701,280_

OPTICAL INFORMATION RECORDING AND/OR REPRODUCING APPARATUS IN WHICH A REPRODUCING LIGHT BEAM IS MODULATED WITH AT LEAST A 100% DEGREE OF MODULATION

This application is a continuation of application Ser. No. 08/254,056, filed Jun. 3, 1994, now abandoned.

BACKGROUND OF THE INVENTION

1. Field of the Invention

The present invention relates to an optical information recording and/or reproducing apparatus which performs recording and verification at the same time using a plurality of light sources.

2. Related Background Art

There are known recording and/or reproducing apparatus for optically recording and/or reproducing information, for example, magneto-optical disc apparatus utilizing the interaction of heat and a magnetic field, and phase-change disc apparatus utilizing the a thermal action. These recording and/or reproducing apparatus generally perform so-called verification in order to enhance reliability, in which immediately after recording of information, the recorded information is reproduced and compared to be verified with the original recording information so as to confirm whether or not the information was able to be properly recorded. Further, various methods for performing recording and verification simultaneously has been recently proposed in order to shorten the time for verification. As such a method for performing recording and verification simultaneously, a double beam method is known, in which, for example, one of two light sources is used for recording and the other for verification. Namely, a light beam from a recording light source is irradiated in advance on a track of a recording medium to record information, and a light beam from a verifying light source is scanned thereafter to reproduce the recorded information based on the reflected light from the track, whereby recording and simultaneous verification, i.e., direct verification is effected.

FIG 1. 1 is a structural drawing to show the scheme of an information recording and/or reproducing apparatus employing the double beam verification system as described above. In FIG. 1, reference numeral 1 denotes a magneto-optical disc, i.e., an information recording medium, and numeral 2 an electromagnet provided above the upper surface of disc 1. An optical system (optical head) is provided under the magneto-optical disc 1, in which a first semiconductor laser 4 is formed as a light source for recording information and a second semiconductor laser 5 as a light source for verification. The first and second semiconductor lasers 4 and 5 are arranged to be close to each other. Optical beams from the lasers each are converged by an objective lens (not shown) in the optical system 3, so as to form images as recording and verifying light spots juxtaposedly aligned on an information track on the magneto-optical disc 1. The light beam from the first semiconductor laser 4 is irradiated in advance on the information track and the light beam from the second semiconductor laser 5 is irradiated to follow the light beam from the first semiconductor laser.

A modulation current is supplied from a first current source 6 to the first semiconductor laser 4, which is modulated in accordance with an information signal to be recorded, and the light beam from the first semiconductor laser 4 is intensity-modulated in accordance with the information signal. On the other hand, a direct current is supplied from a second current source 7 to the second semiconductor laser 5, which is driven to be on at reproduction power. In this case, there is such a known method that a high-frequency signal having a frequency sufficiently higher than that of the recording signal is applied to the second semiconductor laser 5 in order to reduce return light noise generated when the second semiconductor laser 5 is made to be on at low power. However, the above conventional apparatus is so arranged that the high-frequency signal is not applied to the second semiconductor laser 5, but a low-noise semiconductor laser is employed. Furthermore, although various circuits and mechanisms such as a servo control circuit, a signal reproducing circuit and a disc rotating mechanism are necessary in addition to the above arrangement, those are well known and therefore omitted in FIG. 1.

When information is to be recorded on the magneto-optical disc 1, information on the disc is first erased before recording . Upon erasing of information, a magnetic field directed in a certain direction, i.e., an upward or a downward field (a downward magnetic field in FIG. 2A), is applied from the electromagnet 2 to the magneto-optical disc 1 as shown in FIG. 2A, and at the same time, a high power light beam with a certain intensity sufficient to record information is irradiated from the first semiconductor laser 4. The magnetization in the magneto-optical disc 1 is orientated in a certain direction (downward in FIG. 2B) by the above operation, so that the information on the disc is erased. Then, as shown in FIG. 2B, a magnetic field directed in the direction opposite to that upon erasing is applied to the magneto-optical disc from the electromagnet 2, and at the same time a light beam intensity-modulated in accordance with the recording signal is irradiated from the first semiconductor laser 4.

Namely, the light beam from the first semiconductor laser 4 is modulated between a high level of output power sufficient to record information and a low level of output power not to record information, in accordance with the recording signal and the thus modulated beam is irradiated onto the recording layer on the magneto-optical disc 1. By this operation, upward or downward information pits are formed in the recording layer on the magneto-optical disc 1 in accordance with the recording signal, as shown in FIG. 2B, whereby a series of information pieces are recorded in the form of information pit strings on an information track on the magneto-optical disc 1. On the other hand, during recording of information, the second semiconductor laser 5 is also made to be on at the reproducing power and a beam therefrom is scanned on the information track as it follows the light beam of first semiconductor laser 4. The reflected light of the second semiconductor laser 5 from the disc surface is detected by an optical sensor in the optical system 3 and recorded information is reproduced based on the detected signal in an unrepresented signal processing circuit. As described above, information is recorded while the recorded information is simultaneously reproduced. Further, the reproduced information and the original recording information are compared with each other, whereby direct verification is accomplished.

However, since the two semiconductor lasers were arranged close to each other in the above-described conventional double beam verifying system, there was such a problem that a modulating current, by which the first semiconductor laser 4 for recording was modulated based on recording signals, went as noise into a drive current of the second semiconductor laser 5. This in turn caused a problem that if the recorded information was reproduced using the light beam with noise components, they were mixed in the reproduced information as they were, lowering the reliability of verification. Further, in order to reduce such cross-talk noise, two semiconductor lasers should be simply located apart from each other or two current sources should be simply arranged apart from each other. However, such a method would result in an increase in the size of the optical system and there is a limitation of separation of the two semiconductor lasers and the two current sources.

Under the above circumstances, an object of the present invention is to provide an optical information recording and/or reproducing apparatus which reduces noise components going into the verifying light beam, whereby the reliability is considerably improved in the double beam verification.

SUMMARY OF THE INVENTION

The present invention provides, for achieving the above-described object, an optical information recording and/or reproducing apparatus comprising a first light source for recording or erasing information, first driving means for modulating a light beam from the first light source in accordance with a recording signal, a second light source for verification, second driving means for supplying a current to the second light source to make the second light source emit a reproducing light beam, which are so arranged that the light beam from the first light source leads on an information track on an optical recording medium, that the light beam from the second light source follows on the information track, and that based on reflected light from the optical recording medium, of the light beam from the second light source, information recorded by the light beam from the first light source is reproduced for verification, an inductor disposed in a current supply path from the second driving means to the second light source, which has an impedance sufficiently larger than an impedance of the second light source at a recording signal frequency, and a high-frequency oscillator for modulating a light output from the second light source, which applies a high-frequency current with a frequency sufficiently higher than the recording signal frequency.

DESCRIPTION OF THE PREFERRED EMBODIMENT

Figure 1:
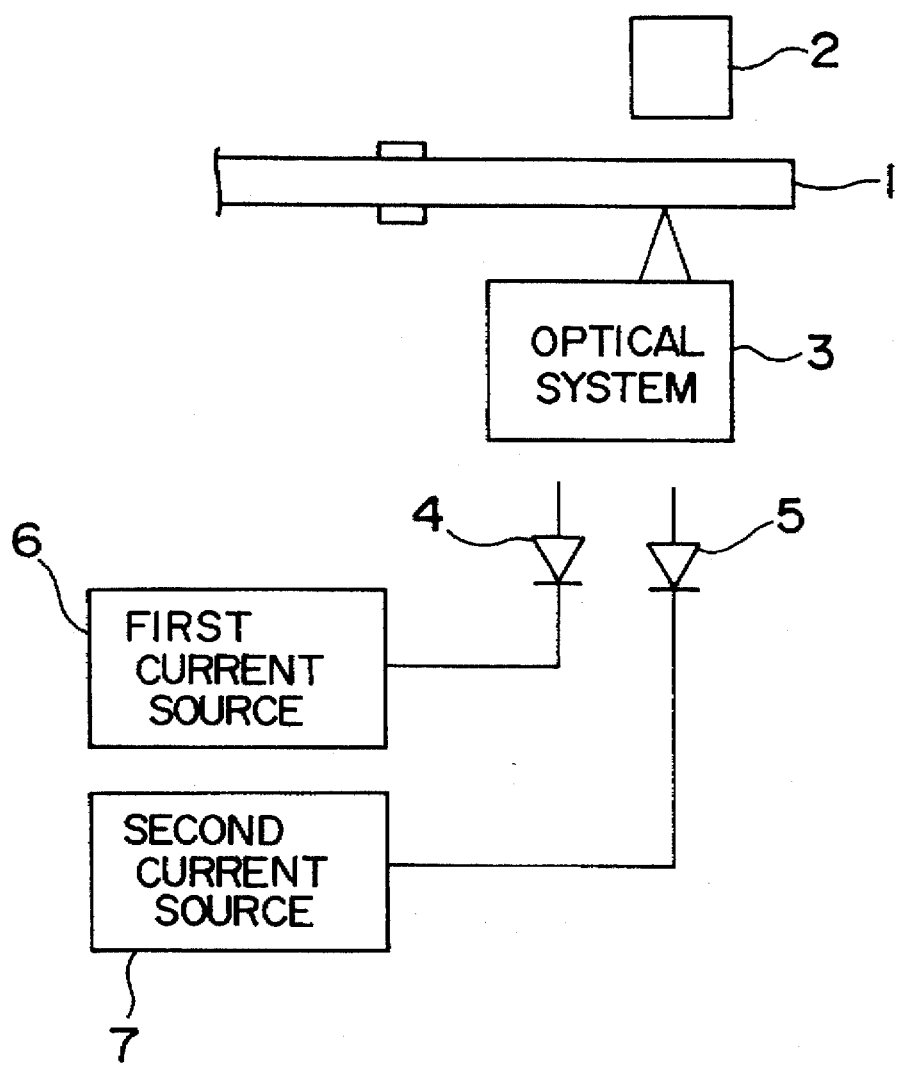
FIG. 1 is a structural drawing to show the schematic structure of a conventional information recording apparatus of the double beam verifying method.
Figure 2A:
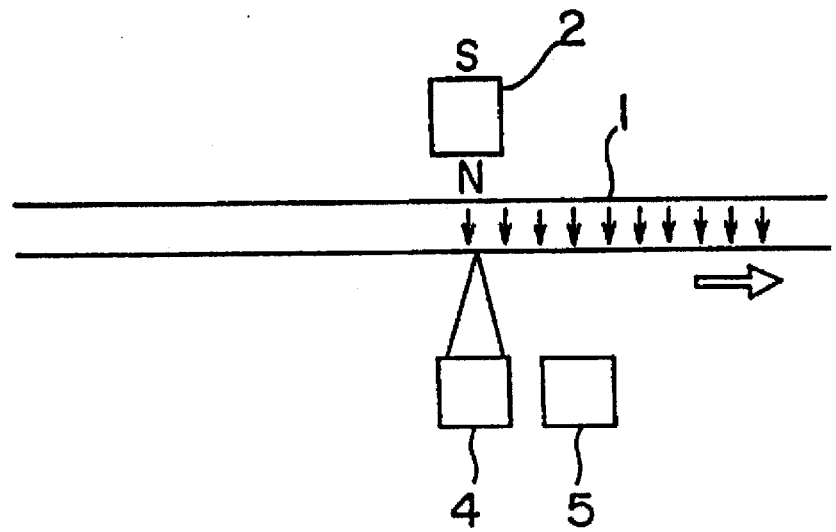
FIGS. 2A and 2B are drawings to illustrate information-erasing and information-recording operations of the information recording apparatus in FIG. 1.
Figure 2B:
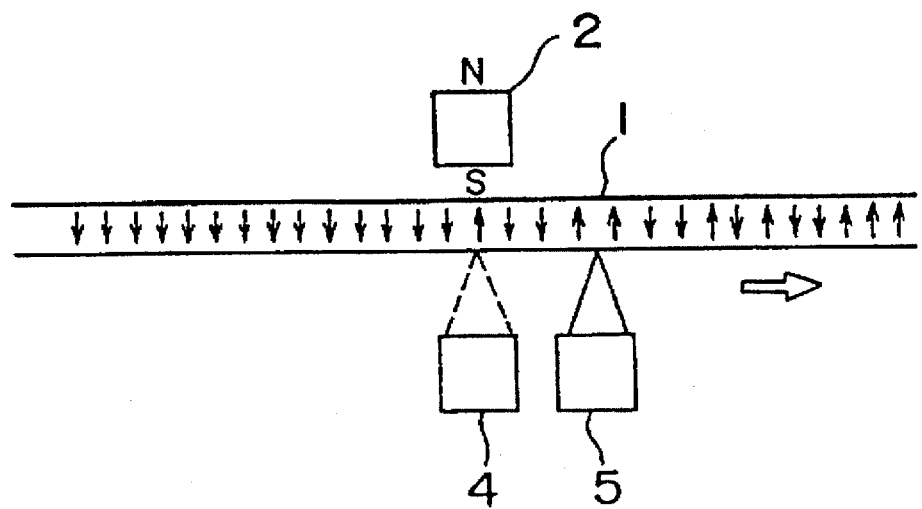
Figure 3:
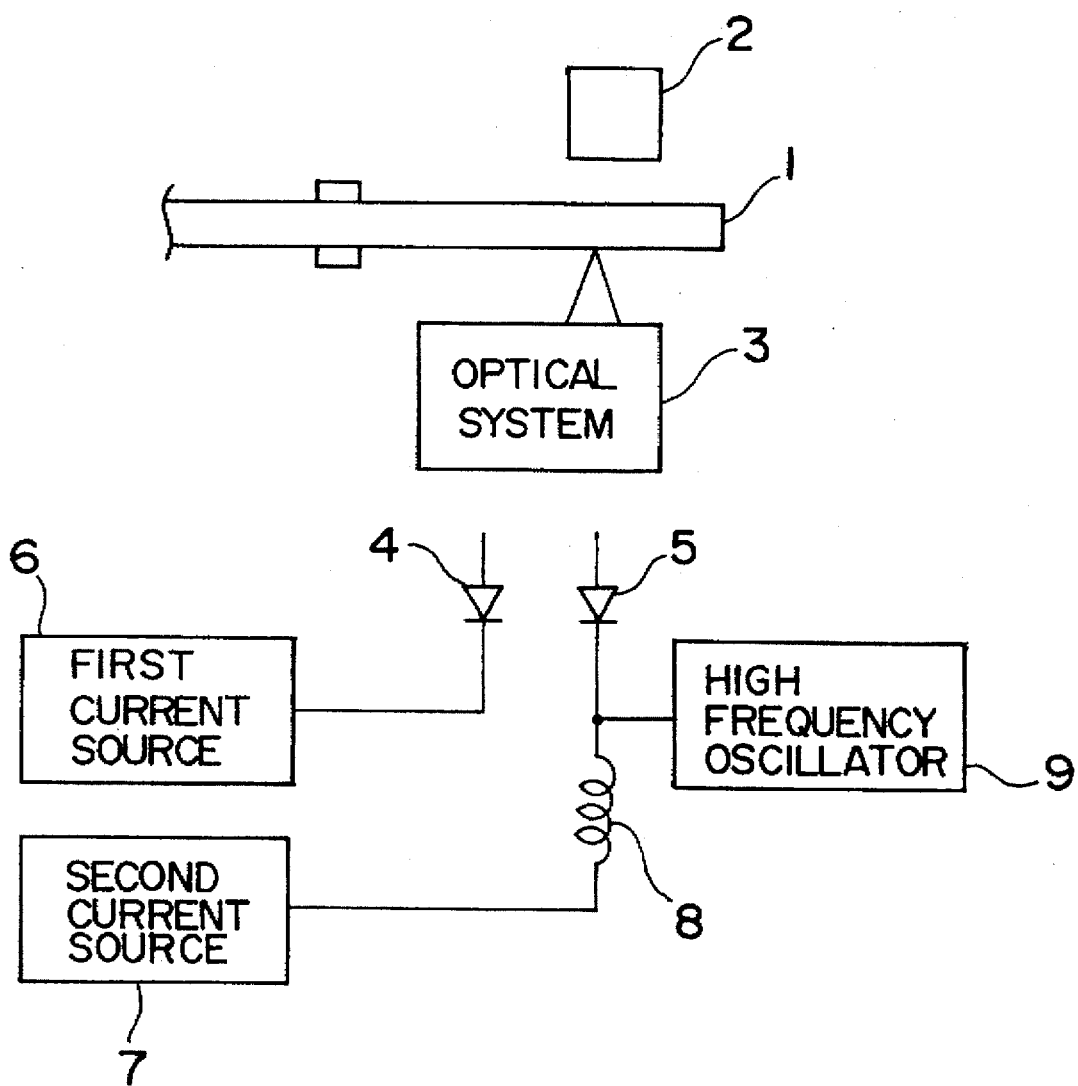
FIG. 3 is a block diagram to show an embodiment of an optical information recording and/or reproducing apparatus of the present invention.

An embodiment of the present invention will be described in detail with reference to the drawings. FIG. 3 is a block diagram to show an embodiment of an optical information recording and/or reproducing apparatus according to the present invention. In FIG. 3, the same constituents as those in the conventional apparatus as shown in FIG. 1 are denoted by the same reference numerals and description will be omitted therefor. In FIG. 3, an inductor 8 is connected between a second semiconductor laser 5 for verification and a second current source 7 as a drive source thereof, which has an impedance sufficiently larger than an impedance of the second semiconductor laser 5 at a recording signal frequency. The inductor 8, which will be described in detail later, functions to prevent a modulating current for the first semiconductor laser 4 from being mixed in the second semiconductor laser 5 as noise. Further, a high-frequency oscillator 9 is connected to the second semiconductor laser 5 so as to supply a high-frequency current having a frequency sufficiently higher than that of the recording signal. Accordingly, the high-frequency current from the high-frequency oscillator 9 is superimposed on the direct current from the second current source 7 to be supplied to the second semiconductor laser 5, and therefore the second semiconductor laser 5 flashes at the frequency of the high-frequency current. In this case, the second semiconductor laser 5 is driven by the direct current and the high-frequency current, and the direct current of the second drive source 7 is so adjusted that average power of the two drive currents becomes the reproducing power. Here, since the flashing frequency of the second semiconductor laser 5 is sufficiently higher than the recording signal frequency, the light from the second semiconductor laser 5 is effectively equivalent to light which is steadily on at the reproducing power, for the magneto-optical disc 1 and the signal reproducing system.

Figure 4:
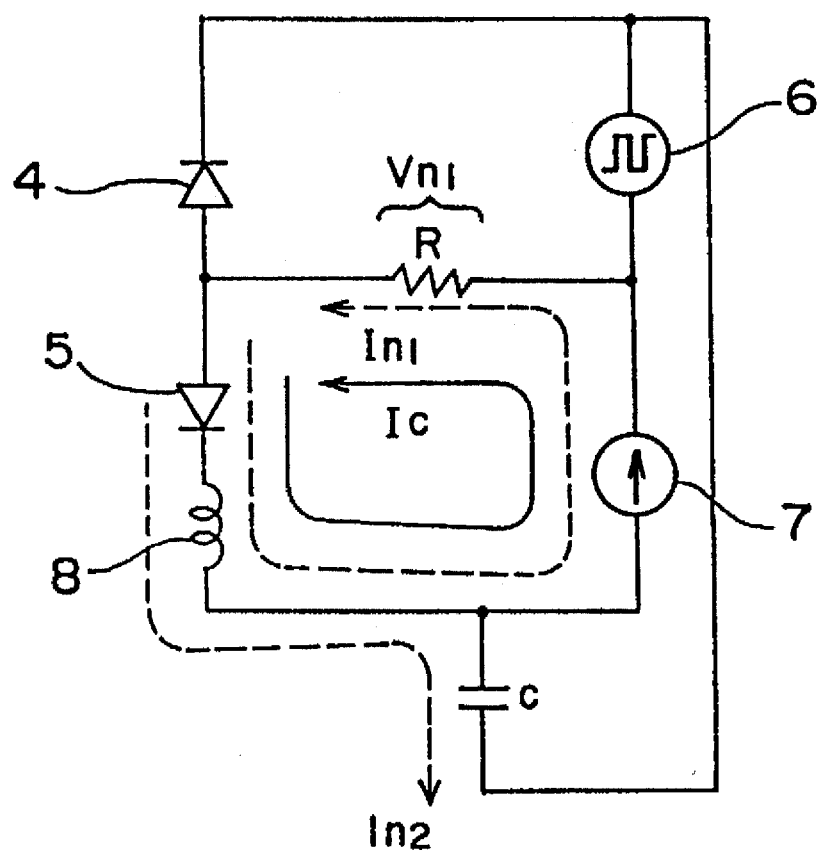
FIG. 4 is a circuit diagram as an equivalent circuit to show a circuit arrangement around first and second semiconductor lasers and first and second current sources in the embodiment in FIG. 3.

FIG. 4 is a circuit diagram as an equivalent circuit to show a circuit arrangement around the first and second semiconductor lasers and the first and second current sources in the embodiment in FIG. 3. In FIG. 4, C is a stray capacitance present between the first and second semiconductor lasers 4 and 5 and between the first and second current sources 6 and 7, and R is a common impedance of a wire pattern and the like from a common terminal of the semiconductor lasers to the laser drivers, for example, which monolithic semiconductor lasers are used as the first and second semiconductor lasers. A noise voltage $V_{n1}$ is induced with the common impedance R by the modulating signal of the first semiconductor laser 4, whereby a noise current $I_{n1}$ flows in the second semiconductor laser 5. Further, the first and second semiconductor lasers 4 and 5 are connected by the stray capacitance C, through which a noise current $I_{n2}$ flows as described above, the modulating signal on the side of the first semiconductor laser 4 could leak as noise into the second semiconductor laser 5 through the common impedance R or the stray capacitance C. However, since the inductor 8 is connected in series to the second semiconductor laser 5, as described above, in the present embodiment, such noise components can be suppressed by the inductor 8 and noise components coming into the second semiconductor laser 5 can be reduced.

Figure 5A:
FIGS. 5A, 5B and 5C are drawings each to show a light output of a second semiconductor laser with a change in degree of modulation.
Figure 5B:
Figure 5C:
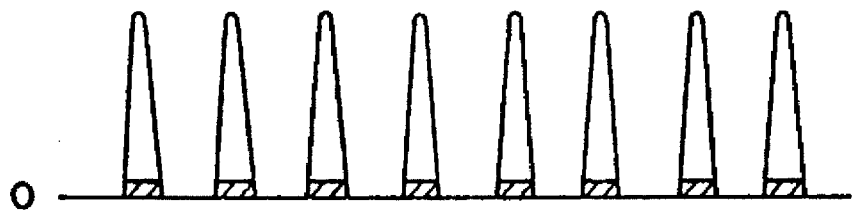

FIGS. 5A to 5C are drawings each to show a light output of the second semiconductor laser 5 with a change in degree of modulation while keeping average power constant. The degree of modulation becomes larger in the order of FIG. 5A, FIG. 5B and FIG. 5C. Further, the hatched portions in FIGS. 5A to 5C show respective noise components leaking in from the first semiconductor laser 4 side. Since a high-frequency current is supplied to the second semiconductor laser 5 from the high-frequency oscillator 9 as described above, the modulation degree of the light power can be adjusted by changing the level of the high-frequency signal. Accordingly, FIGS. 5A to 5C show changes in the ratio of cross-talk noise components to the light output when the modulation degree of the light output of the second semiconductor laser 5 is increased in the order of FIGS. 5A, 5B and 5C. As is evident from FIGS. 5A to 5C, the larger the modulation degree, the smaller the ratio of the cross-talk noise components to the average power. This means that the ratio of the cross-talk noise relative to the average power of the semiconductor laser 5 can be relatively reduced by appropriately selecting the modulation degree of the second semiconductor laser 5, which brings about, as a result, an effect to reduce the cross-talk noise. On the other hand, since the inductor 8 in such a state shows, of course, a high impedance at the oscillation frequency of the high-frequency oscillator 9, it does not allow the output signal from the high-frequency oscillator 9 to leak to the outside and functions to efficiently apply the high-frequency current to the second semiconductor laser 5.

It is clear from the above explanation that the inductor 8 is preferably disposed in the vicinity of the second semiconductor laser 5 and preferably has an impedance sufficiently larger than the impedance of the second current source 7 at the recording signal frequency. Further, in the case where the light output of the second semiconductor laser 5 is modulated by the high-frequency current from the high-frequency oscillator 9, the cross-talk noise can be more reduced as the modulation degree becomes higher. Actually, the cross-talk noise can be sufficiently reduced so long as the modulation degree is at least 100%.

When information is recorded on the magneto-optical disc, a magnetic field in a selected direction is applied to the disc from the electromagnet 2, as described above, and a high-intensity light beam is irradiated from the first semiconductor laser 4 to erase information. Then, the first semiconductor laser 4 is driven by the modulating signal modulated in accordance with the recording signal from the first current source 6, so that information is recorded on the magneto-optical disc 1. During the recording, the light output of the second semiconductor laser 5 is modulated by the high-frequency current from the high-frequency oscillator 9, as shown in FIGS. 5A to 5C, and the thus modulated beam is irradiated onto the magneto-optical disc 1 as the verifying light beam. This light beam is irradiated as it follows the recording light beam from the first semiconductor laser 4 on the information track, and reflected light is detected by the optical sensor in the optical system 3. The information recorded by the recording light beam from the first semiconductor laser 4 is reproduced based on detecting signals of the optical sensor in the unrepresented signal processing circuit, and the reproduced information and the recording information is compared with each other in an unrepresented verifying circuit to effect verification while recording the information at the same time.

According to the embodiment of the present invention, the inductor 8 having the impedance sufficiently higher than the impedance of the second semiconductor laser 5 at the recording signal frequency is provided between the second semiconductor laser 5 for verification and the second current source 7 for supplying a direct current thereto, so that noise components coming in from the first semiconductor laser 4 side through the common impedance R and the stray capacitance C can be well suppressed. Further, the light output of the second semiconductor laser 5 is modulated with a frequency sufficiently higher than the recording signal by the high-frequency current from the high-frequency oscillator 9, whereby the ratio of cross-talk noise in the average power of the second semiconductor laser 5 can be decreased, which can in turn effectively reduce the cross-talk noise coming into the second semiconductor laser 5 from the first semiconductor laser 4, in combination with the noise-mixing suppressing effect of the inductor 8.

Since the constitution according to the present invention appears very close to that for high-frequency application for reducing laser return light noise as described in the description of the related background art, the difference is described below in detail. First, in order to reduce the return light noise of the laser, a frequency of the high-frequency signal applied or a level thereof is determined according to the optical path length, for example. In contrast, the object of the present invention is to reduce cross-talk noise from another juxtaposed light source driving system, and the frequency or the level is not determined according to the optical path length. Namely, the present invention simply requires that the frequency is sufficiently higher than that of the recording signal. Further, the level is the factor to determine the modulation degree and to determine the ratio of cross-talk noise relative to the average power of the light output. Therefore, the level is determined by the conditions of cross-talk noise mixed in the verifying light beam.

Further, in order to reduce the return light noise, an inductor can also be used which is for fully applying power of the high-frequency oscillator to the semiconductor laser without leakage to the outside and which is so set that the impedance thereof is sufficiently lower than the impedance of the semiconductor laser at the oscillation frequency. Furthermore, in view of the size reduction or in a case of application of a current modulated by a recording signal, the impedance of the inductor is generally set to be sufficiently lower than the impedance of the semiconductor laser at the recording signal frequency. On the other hand, the inductor employed in the present invention functions to prevent the noise from coming in from the juxtaposed semiconductor laser, and the impedance should be set to be sufficiently higher than the impedance of the semiconductor laser at the recording signal frequency. Preferably, it should be set to be higher than the impedance of the drive current source thereof. As described above, the present invention appears similar to the conventional technology in structure, but the present invention is different from the conventional technology in object, by which the present invention can be differentiated in the frequency of the high-frequency signal, the level thereof or the impedance of the inductor from the conventional technology.

The present inventors experimentally confirmed that the cross-talk noise mixed in the verifying light beam could be reduced to a level of ⅕ as compared with the conventional case. In detail, experiments were conducted under conditions that the frequency of the high-frequency oscillator was 600 MHz, the modulation degree was 300% and the impedance of the inductor was 500 μH. Further, a monolithic type semiconductor laser array was used to measure cross-talk noise of the verifying light beam of the second semiconductor laser, while the first semiconductor laser was pulse-lit at 15 mW–0 mW and at 4 MHz and the second semiconductor laser was continuously lit at 2.7 mW. As a result, the cross-talk noise was not more than ⅕ of the noise in the conventional case.

As the first and second semiconductor lasers, those of a hybrid type or those of a monolithic type as sealed in a same case, may be used. Since cross-talk noise between the laser chips or through the common terminal and the common wiring, increases with the use of monolithic type lasers, the present invention shows more effective results in a case thereof.

As described above, the present invention can effectively reduce cross-talk noise coming into the verifying light beam from the recording light source side by modulating the light beam of the verifying light source at a frequency sufficiently higher than the frequency of the recording signal and also by placing in the path through which a direct current is supplied to the light source, an inductor having an impedance sufficiently higher than the impedance of the light source at the recording signal frequency. Accordingly, in reproducing the recording information with the verifying light beam, noise components contained in the reproduced information can be well reduced, whereby the reliability of verification can be considerably improved as compared with the conventional case.

What is claimed is:

1. An optical information recording and/or reproducing apparatus comprising:

a first light source for recording or erasing information;

first driving means for modulating a light beam from said first light source in accordance with a recording signal;

a second light source for verification;

second driving means, different from said first driving means, for supplying current to said second light source to cause said second light source to emit a reproducing light beam, wherein the light beam from said first light source leads on an information track on an optical recording medium, the light beam from said second light source follows on the information track, and based on reflected light from the optical recording medium, of the light beam from said second light source, information recorded by the light beam from said first light source is reproduced for verification;

an inductor disposed in a current supply path from said second driving means to said second light source, said inductor having an impedance sufficiently larger than an impedance of said second light source at a frequency of the recording signal; and a high-frequency oscillator for modulating a light output from said second light source, said oscillator applying a high-frequency current having a frequency sufficiently higher than the frequency of the recording signal, wherein a degree of modulation of the light output from said second light source by said high-frequency oscillator is at least 100% and said high-frequency oscillator is not connected to said first light source so that when information is recorded on the recording medium, said first light source is modulated in accordance with the recording signal and said second light source is modulated by the high current of said high-frequency oscillator.

2. An optical information recording and/or reproducing apparatus according to claim 1, wherein said first and second light sources are monolithic semiconductor lasers formed on a substrate.

3. An optical information recording and/or reproducing apparatus, which records information on a recording medium by a first light beam, emitted by a light source, and verifies the recorded information based on reflected light, of a second light beam emitted by light emitting means, from the recording medium, said apparatus comprising:

first driving means for modulating the first light beam in accordance with a recording signal;

an inductor disposed close to the light beam emitting means for emitting the second light beam, said inductor having an impedance sufficiently larger than an impedance of the light beam emitting means at a frequency of the recording signal;

second driving means, different from said first driving means, for supplying current to the light beam emitting means; and a high-frequency oscillator for modulating the second light beam, said oscillator applying a high-frequency current having a frequency sufficiently higher than the frequency of the recording signal, wherein a degree of modulation of the light output from said light beam emitting means by said oscillator is at least 100% and said high-frequency oscillator is not connected to the light source so that when information is recorded on the recording medium, the light source is modulated in accordance with the recording signal and the light beam emitting means is modulated by the high current of said high-frequency oscillator.

4. An apparatus according to claim 1, wherein said inductor prevents a modulating current for modulating said first light source with the recording signal from being mixed in the drive current of said second light source as noise.

5. An apparatus according to claim 1, wherein said high-frequency oscillator reduces a ratio of cross-talk noise to an average light power of said second light source.

* * * * *

UNITED STATES PATENT AND TRADEMARK OFFICE
CERTIFICATE OF CORRECTION

PATENT NO. : 5,701,280          Page 1 of 2
DATED      : December 23, 1997
INVENTOR(S): AKIRA MIYASHITA It is certified that error appears in the above-identified patent and that said Letters Patent is hereby corrected as shown below:

ON THE COVER PAGE

AT ITEM [56] "U.S. PATENT DOCUMENTS"

Before the first patent listed, the following should be inserted
--5,191,204   3/1993   Dickson, et al.
  5,157,649  10/1992   Suzuki--; and After the last U.S. patent listed, insert
--       FOREIGN PATENT DOCUMENTS 2,144,912   3/1985   United Kingdom

OTHER PUBLICATIONS

Patent Abstracts of Japan, Kokai No. 2-294946, Vol. 15, No. 75, 2/1991.

Patent Abstracts of Japan, Kokai No. 58-196630, Vol. 8, No. 45, 2/1984.--.

UNITED STATES PATENT AND TRADEMARK OFFICE
CERTIFICATE OF CORRECTION

PATENT NO.   :   5,701,280
DATED        :   December 23, 1997
INVENTOR(S)  :   AKIRA MIYASHITA It is certified that error appears in the above-identified patent and that said Letters Patent is hereby corrected as shown below:

IN THE DISCLOSURE

COLUMN 1:

Line 30, "has" should read --have--; and
    Line 42, "FIG. 1.1" should read --Fig. 1--.

COLUMN 5:

Line 52, "is" should read --are--.

Signed and Sealed this

Seventh Day of July, 1998

Attest:

BRUCE LEHMAN

Attesting Officer    Commissioner of Patents and Trademarks